United States Patent [19]

Miller et al.

[11] 4,102,222
[45] Jul. 25, 1978

[54] TRANSMISSION CONTROL SYSTEM

[75] Inventors: Alan Leonard Miller, Mount Prospect; Werner Paul Petzold, Harwood Heights, both of Ill.

[73] Assignee: Borg-Warner Corporation, Chicago, Ill.

[21] Appl. No.: 756,470

[22] Filed: Jan. 3, 1977

[51] Int. Cl.$^2$ ............................................. B60K 41/10
[52] U.S. Cl. ...................................................... 74/866
[58] Field of Search ................. 74/866, 862, 863, 864, 74/865, 869

[56] References Cited

U.S. PATENT DOCUMENTS

| | | | |
|---|---|---|---|
| 3,726,159 | 4/1973 | Mizote | 74/866 |
| 3,881,368 | 5/1975 | Furuhashi et al. | 74/866 |
| 3,882,740 | 5/1975 | Forster et al. | 74/866 |
| 3,941,015 | 3/1976 | Robinson | 74/864 |
| 3,961,546 | 6/1976 | Gilmore et al. | 74/866 |
| 3,983,766 | 10/1976 | Forster et al. | 74/866 |
| 4,008,567 | 2/1977 | Hirsch | 74/866 X |
| 4,031,782 | 6/1977 | Miller et al. | 74/866 |

*Primary Examiner*—Samuel Scott
*Assistant Examiner*—Lance W. Chandler
*Attorney, Agent, or Firm*—James J. Jennings, Jr.

[57] ABSTRACT

A control system changes the gear ratio in an automatic transmission when engine torque is transferred from one member to another member of a three member planetary gear set. This transfer is accomplished through friction elements engaged and released by hydraulic pressure, without the use of one-way clutches. A closed loop electrical circuit is completed between a transducer, which provides an electrical signal related to the output torque of the transmission, and a pair of control valves, to vary the pressure applied by each control valve. A circuit for computing reaction torque is coupled between the transducer and a logic control circuit, which provides logic command signals for controlling operation of components in the closed loop circuit. The closed loop circuit includes two pulse width modulation circuits for regulating operation of the two control valves. The system calculates the value of the engine acceleration torque for the shift, subtracts this value from the initial output torque value to obtain the desired torque level for the shift, and uses this desired torque level to regulate the shift.

15 Claims, 16 Drawing Figures

TRANSDUCER 44

TRANSMISSION CONTROL SYSTEM

BACKGROUND OF THE INVENTION

Various systems have been devised and implemented to control the change of gear ratios in an automatic transmission. This is generally done with a hydraulic system, including a hydro-mechanical control valve mechanism for modifying the pressure applied to various friction elements in the transmission and to selectively hold and release different components of a planetary gear set. For example, the engine output shaft can be connected to drive the sun gear of such a set, which also includes a plurality of planet gears rotatable on a carrier element and disposed between the sun gear and the outer ring gear. When the ring gear is held against rotation, output drive torque is available from the planet carrier at a first speed ratio. To change ratio, the sun gear is locked to the outer ring gear, which is no longer held against rotation, providing a direct drive connection. This is the operation which occurs in a typical upshift.

A great deal of research has been directed to optimizing the shift "quality". In general, it is not desirable to have a shift of very brief duration, as this produces a jerk by the rapid change in vehicle acceleration, which is very noticeable and found objectionable by most drivers. If the shift time is stretched out for too long a period, undue wear is imposed on the friction elements and other components of the transmission. Therefore, the optimum shift quality occurs somewhere between the too-short time duration, producing the objectionable jerk sensation, and the too-long time duration producing the objectionable component wear. A comprehensive treatment of this subject has been provided by F. J. Winchell and W. D. Route in "Ratio Changing the Passenger Car Automatic Transmission", which appears as Chapter 10 in the SAE publication "Design Practices—Passenger Car Automatic Transmissions", Copyright by the Society of Automotive Engineers, Inc., 1973. In particular FIG. 21 of this chapter depicts speed, torque and pressure variations during a power-on upshift.

A significant advance in ratio-changing control has been achieved in a control system which regulates the energization of the on-coming friction element, in which the off-going friction element is embodied in a two-way clutch which automatically releases. Hence, the control is directed only to the precise regulation of the on-coming element in a three member planetary gear set. This significant advance is described and claimed in the earlier application of Alan L. Miller and John S. Ivey entitled "Transmission Control System", filed Feb. 27, 1976, Ser. No. 661,896, and which is assigned to the assignee of this invention.

Such earlier systems generally use a controlled friction element in parallel with the one-way clutch, for reasons explained hereinafter. If the friction element can be precisely controlled, the one-way clutch can be eliminated. It is therefore a principal object of this invention to provide a more economical control system for shifting an automatic transmission, in which precise control is provided not only for the on-coming friction element but also for the off-going friction element, to obviate the need for a one-way clutch.

SUMMARY OF THE INVENTION

An electronic control system is provided to regulate the change of gear ratio in an automatic transmission. A transducer is positioned to sense the transmission output torque and to provide an electrical signal which varies as a function of that torque. A first control valve varies the fluid pressure to the energizing portion of the on-coming friction element, and a second control valve varies the fluid pressure to the de-energizing portion of the off-going friction element to effect a change in gear ratio, and an error signal is provided to control the operation of both valves. A closed loop controller is coupled between the transducer and the control valves, to receive the torque-indicating signal and provide the signals for regulating both control valves as a function of the output torque signal.

In accordance with this invention, a downshift control circuit is added to provide the requisite command signals for application to the closed loop controller, so that both the on-coming and off-going elements are regulated. This is accomplished by calculating the value of the engine acceleration torque required for the shift, and subtracting this value from the initial (pre-shift) output torque to obtain the desired level of torque to be maintained during the shift.

THE DRAWINGS

In the several figures of the drawings, like reference numerals identify like components, and in those drawings.

GENERAL BACKGROUND DISCUSSION

Figure 1:
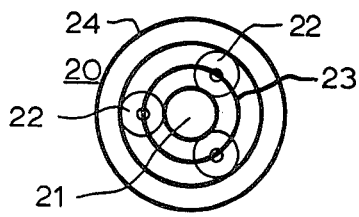
FIGS. 1 and 2 are simplified diagrams indicating basic components of an automatic transmission.
Figure 2:
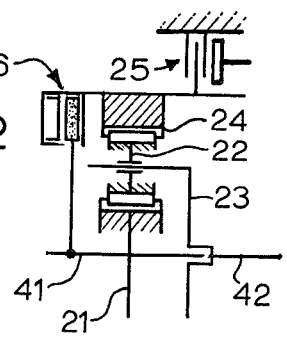

FIGS. 1 and 2 show a general arrangement of a planetary gear set 20, of a type which may be used in automatic transmissions. Planetary gear set 20 is adapted to provide a drive relationship between a drive shaft 41 and a driven shaft 42. A sun gear 21 is connected to shaft 41, which represents the input mechanical driving connection to the automatic transmission. That is, drive shaft 41 and sun gear 21 receive drive from the engine or other prime mover. Meshed with sun gear 21 are a plurality of pinion gears 22, generally termed "planets" in that they can rotate around the sun gear 21 in addition to rotating upon their own axes. A carrier 23 is provided, connected to driven shaft 42, and has rotatably journalled thereon each of the planet gears 22. Outside the planet gears is a ring gear 24, which has teeth on its inner surface meshing with the teeth of the planet gears as they rotate with respect to the ring gear. In general when the sun gear 21 is driven with the ring gear 24 held stationary, output drive torque is available from planet carrier 23 and driven shaft 42.

FIG. 2 shows a friction clutch 25, operable to provide a connection between ground or a stationary member and ring gear 24. Those skilled in the art will appreciate that a band or other braking member can be released as clutch 25 is de-energized to release the off-going member. Hence, although generically a clutch, member 25 will be described as a brake herein. A friction clutch 26 is schematically illustrated as engageable to connect ring gear 24 and sun gear 21 for rotation together.

If the ring gear 24 is locked against rotation, then the planet gears 22 are rotated when the sun gear is driven, and output drive at a first reduced speed ratio may be taken from driven shaft 42. When it is desired to change the speed ratios, or shift gears, this is accomplished by releasing the outer ring gear 24 and connecting the ring gear with sun gear 21. This provides a direct drive between the input and output shafts at a second speed ratio of 1:1. Of course additional combinations of planet and ring gears can be provided to produce a multiplicity of speed ratios in an automatic transmission, but the showing of FIGS. 1 and 2 is sufficient for a background discussion of the ratio changing. Brake 25 holds ring gear 24 against rotation in one direction to establish the reduced drive ratio and permits free rotation of ring gear 24 in the other direction. Clutch 26 is engaged to directly connect the sun gear with the ring gear, to provide the second speed ratio.

Figure 3:
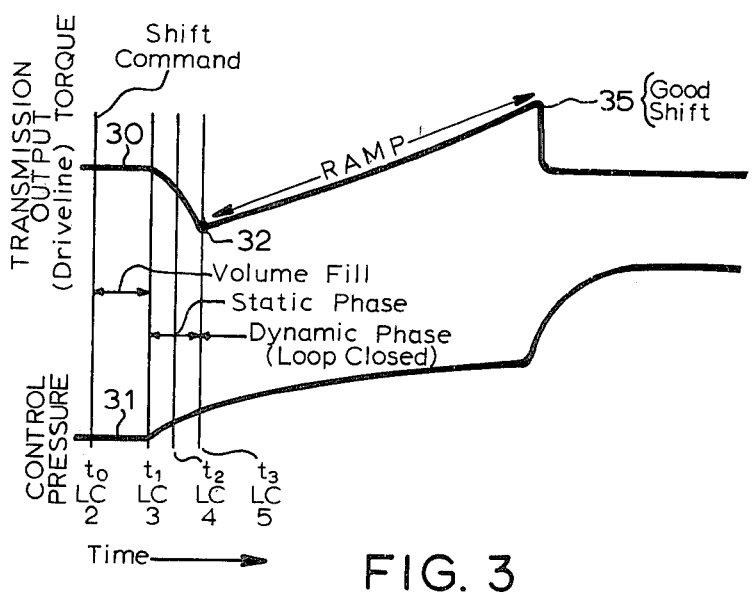
FIG. 3 is an idealized graphical illustration useful in understanding the shift characteristics of an automatic transmission.

FIG. 3 illustrates two different curves 30 and 31, useful in explaining a power upshift. Curve 30 denotes the torque at the transmission output connection, generally termed driveline torque. Curve 31 represents the pressure acting on the piston of the oncoming friction element. At the outset the driveline torque is equal to the engine output times the gear ratio (neglecting efficiency), and the element pressure remains at zero; at time $t0$ a shift command is initiated. This command can be supplied by the operator or received from a shift point computer in a manner well known and understood by those skilled in the art. Between time $t0$ and time $t1$, the transmission remains in the "volume fill" phase of the shift operating sequence, as the piston volume of the actuator is being filled with virtually no change in the control pressure and no change in the torque. This occurs because even though fluid is being admitted under pressure to engage the friction element, there is a certain amount of slack, or open space in the piston; this volume must be filled before there is an actual physical engagement of the friction element with the reaction member. At time $t1$ the "static" phase of the shift sequence is commenced, as the oncoming friction element begins to apply torque to its associated gear or other component. In the static phase, from $t1$ to $t3$, the control pressure and torque are changing, but there is no change in the engine speed. A significant aspect of the system in the earlier application is a feed-forward circuit, to be explained hereinafter, to compensate for the system operating delay which would otherwise result from the time required to fill the piston volume and commence the static phase of the shift at time $t1$.

At the time $t2$ the system is half-way through the static phase of the shift. Subsequently, it will be apparent that the system generates a particular logic command signal for use at this time, but for the present it is sufficient to note that the control pressure is still rising at time $t2$, and the driveline torque is still dropping as the oncoming friction element begins to apply a force to its associated gear. At time $t3$ the static phase of the shift is completed, and brake 25 is released. As shown at point 32 on the torque curve 30, the driveline torque begins to increase at this time, $t3$, which also marks the end of the static phase and beginning of the "dynamic" phase of the shift. It is at this time—beginning the dynamic phase of the shift—that the control loop of the system is closed, as will be explained hereinafter.

The change in driveline torque can occur over a short, medium or long time span. If the shift is accomplished in a relatively short time, this results in poor "feel", or an objectionable jerk being felt by the driver. If the dynamic phase of the shift is extended over a very long time, this imposes excess wear on the transmission and associated components. One satisfactory compromise is, represented by curve 35. This means that the shift occurs over a sufficiently brief time duration so that excess component wear is not caused, and likewise that the driver does not feel a jerk or rapid transition in the shift. A discussion of the shift quality is set out in the "Power-On Upshift" section of the SAE reference noted previously. It is toward the production of a good quality shift, with control of both clutch 26 and brake 25, that the present invention is directed.

DESCRIPTION OF EARLIER EMBODIMENT

Figure 4:
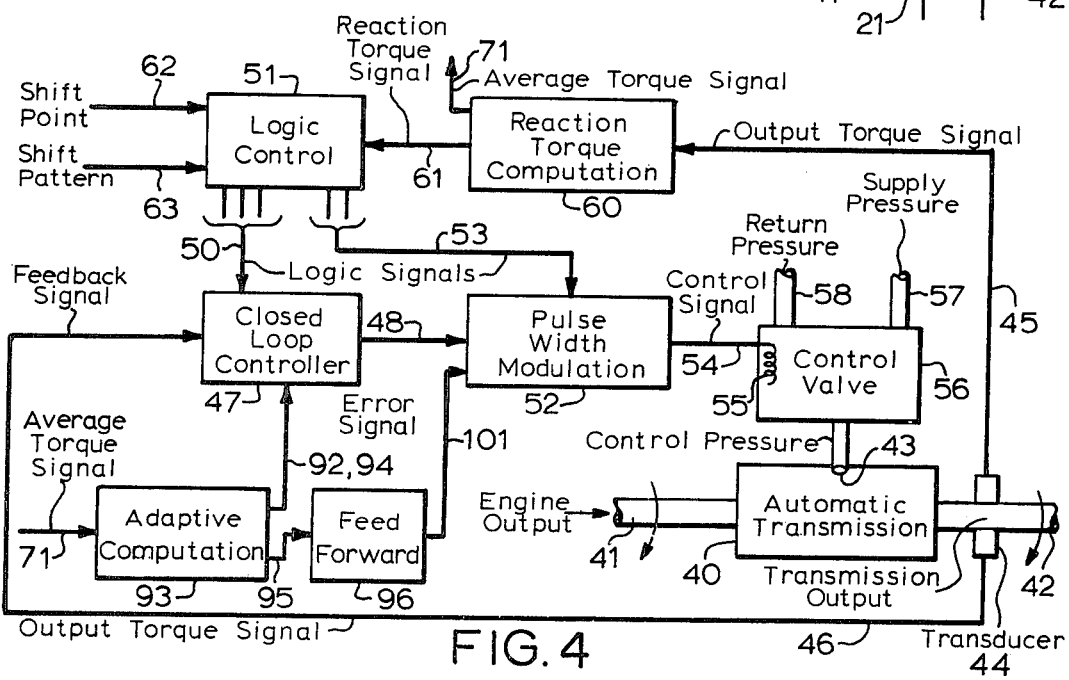
FIG. 4 is a block diagram of an electronic control system such as that described and claimed in the earlier application noted above.

FIG. 4 depicts in a block arrangement an electronic control system already developed, and described in the earlier application, for changing the gear ratio in an automatic transmission 40. The earlier embodiment will first be described, to provide background for the system of this invention. An input shaft 41 represents the input mechanical driving connection to the transmission, and this is normally coupled to the output of the engine or other prime mover. The output driving connection of the transmission, which would be taken from the carrier as described above, is represented by the shaft 42. This shaft is normally coupled to a shaft for driving the vehicle wheels. In addition the transmission includes at least one fluid inlet 43 for receiving a fluid under pressure to control the friction element and thus control the change of gear ratio.

A transducer 44 is positioned to sense the torque at the output driving connection of the transmission, and to provide an electrical signal which is a function of the output torque, on each of lines 45 and 46. A closed loop controller 47 comprises a plurality of components, as will be explained hereinafter, for providing an error signal on line 48 as a function of both the output torque signal received as a feedback signal over line 46, and a plurality of logic command signals received over line 50 from a logic control circuit 51. The error signal on line 48 is applied to a pulse width modulation circuit 52, which also receives a plurality of logic command signals over line 53 from the logic control circuit. The output signal from the pulse width modulation circuit 52 is a control signal which is applied over line 54 to a winding 55 which is part of an electro-hydraulic control valve 56, the output side of which is coupled to the inlet 43 of the automatic transmission. Conduit 57 is connected to receive a fluid under pressure from a pump (not shown) in a manner well known and understood in this art.

A reaction torque computation circuit 60 is connected to receive the output torque signal over line 45 and produce, on output line 61, a simulated reaction torque signal for application to the logic control circuit 51. The logic control circuit also receives a signal over line 62 representing a shift point, to indicate issuance of a shift command. A shift pattern signal can be generated and supplied over line 63 to the logic control circuit 51. The shift pattern signal on line 63 is that provided when the driver moves the shift lever into a position (that is, a position such as "park", "reverse", "neutral", "drive" and so forth) which changes the operation of a control valve (not shown), and "tells" the electrical system which control valve is to be operated. The shift point signal on line 63 is derived from a unit (not shown) which issues a signal when a shift—up or down—should be initiated. Electronic systems for providing this signal are also available. For purposes of this explanation, conductor 62 is considered as means for providing a shift point signal, and conductor 63 is deemed means for providing a shift pattern signal. The logic control circuit 51 receives the reaction torque signal, the shift point signal and the shift pattern signal (an explanation of the shift pattern signal is not necessary to an understanding of the basic system operation), and provides a plurality of logic command signals for application over the output cables 50, 53 to effect the operation of components within closed loop controller 47 and the operation of pulse width modulation circuit 52. The reaction torque computation circuit 60 is an important component of the earlier system.

Reaction torque computation circuit 60 also provides an average torque level signal on line 71, by averaging the instantaneous torque signal received from the transducer over a given time period. This average torque signal is applied to an adaptive computation circuit 93, which produces output signals that vary as a function of the average torque level. The first output signal from adaptive computation circuit 93 is applied over line 92, 94 as an input command signal to closed loop controller 47. This first output signal affects the controller operation and varies both (1) the slope of the "ramp" portion of torque curve 35, and (2) the gain of the closed loop controller. The second output signal from adaptive computation circuit 93 is applied over conductor 95 to a feed-forward circuit 96, which in turn passes a signal over line 101 to pulse width modulation circuit 52. The feed-forward circuit in effect compensates the control valve 56 operation for the time required ($t0$-$t1$, FIG. 3) to fill the piston before the static phase of the shift is commenced. Hence the adaptive computation circuit 93 and the feed-forward circuit 96 improve the overall regulation of the earlier closed loop control system.

DETAILED DESCRIPTION OF THE EARLIER SYSTEM

Figure 5:
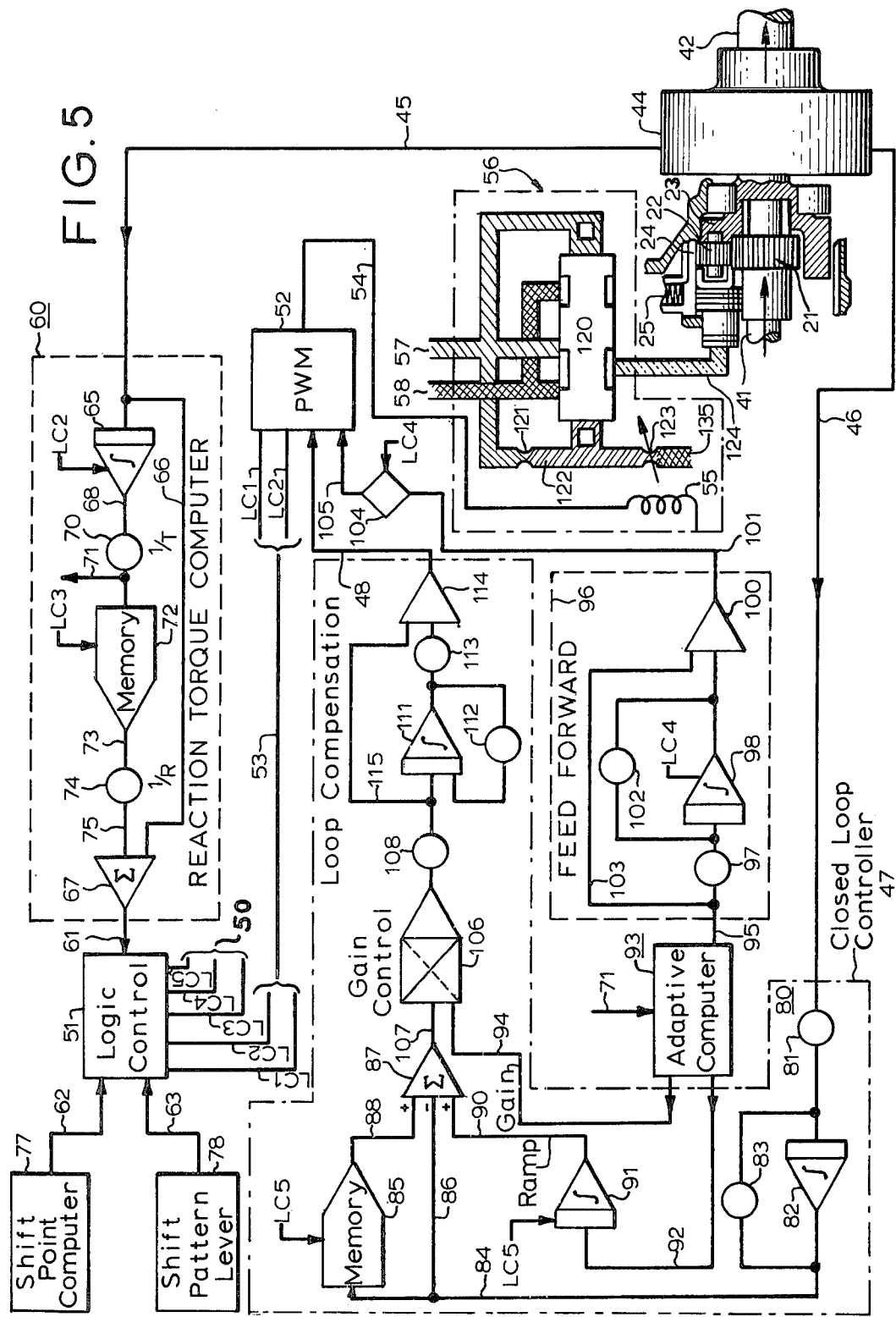
FIG. 5 is a block diagram, partly in schematic form, similar to FIG. 4 but depicting additional details of that system.

FIG. 5 depicts the earlier basic electronic control system in more detail. Reaction torque computer circuit 60 is shown to include several stages, with the line 45 being coupled both to the input side of an integrating stage 65 and, over line 66, to one input connection of a summation stage 67. The output side of integrating stage 65 supplies the integrated torque signal over line 68 to a passive circuit 70, effective to multiply the signal on line 68 by the ratio 1/T, representing a time division to produce on line 71 a signal which represents the average driveline torque provided on shaft 42 over the time period T. The application of logic command signals LC2 to the integrating stage 65 and LC3 to the memory stage 72 are shown, with each logic command signal being generated by the logic control circuit 51 as will be explained hereinafter. The output of memory stage 72 then supplies the average driveline torque signal (for the time T) over line 73 to the passive stage 74, effective to multiply this signal by 1/R or provide on line 75 a signal which represents the average driveline torque adjusted for the gear ratio R. This signal on line 75 is the other input signal to summation stage 67, which then provides the reaction torque signal on line 61 for application to the logic control circuit 51.

Those skilled in the art will appreciate that the reaction torque computer circuit 60 is depicted with simplified analog components connected to provide a reaction torque signal on line 61 as a function of a received instantaneous torque signal on line 45. This is done with the illustrated integrating, memory, divide down and summation stages. It will be apparent that a microprocessor or other digital circuits can be connected to operate in a known fashion to produce the reaction torque signal on line 61 in response to the received instantaneous torque signal on line 45. Hence the terms "reaction torque computation circuit" and "adaptive computation circuit", as used herein and in the appended claims, embrace both the analog and digital forms of such circuits which are well known and understood in this art.

Shift point computer 77 provides a signal on line 62 to the logic control circuit 51 when a "shift" command is initiated. Likewise a shift pattern lever 78 is conventionally used to provide the shift pattern signal on line 63 to the logic control circuit.

The instantaneous output torque signal on line 46 is applied as shown to the closed loop controller 47, and is initially applied to a feedback filter circuit 80. The signal passes through a first passive component 81 and an active stage 82; a passive component 83 is coupled in parallel with stage 82. The passive components depicted by the circular symbols (such as 81, 83) can be implemented by the use of a fixed or variable resistor. Filter circuit 80 provides a filtered output signal on line 84 which is applied both to the input side of a memory stage 85 and, over line 86, to one of the input connections of a summation stage 87, which also receives second and third input signals. The second input signal is received over line 88 from memory 85, which receives not only the filtered input signal on line 84 but also receives an LC5 logic command signal from logic control stage 51. All of the logic command signals (LC1-LC5) are operational mode signals. As will be explained further, they issue in a time sequence ($t0$-$t3$, FIG. 3) to regulate the operational state of other components, rather than provide information or command input signals to those components. The third input signal received by summation stage 87 is received over line 90 from another active stage 91, an integrator stage which is connected to provide a ramp slope signal as a function of a level or amplitude signal received over line 92 from an adaptive computer 93. The ramp slope stage 91 also receives an LC5 logic command signal. Thus stage 87 receives a feedback signal on line 86, and on lines 88, 90 receives ramp-determining signals which are collectively termed the "input command" signal.

The adpative computer 93 in FIG. 5 includes three circuits, which will be described hereinafter, each of which receives the signal over line 71 from the reaction torque computer denoting the average driveline torque during a time period T. The instantaneous driveline torque varies because of the engine variations, torsional vibrations, wheel slip and other irregularities. Hence an average signal must be provided to avoid erroneous operation of the system, and this average signal must be provided in a preset time frame during the shift sequence. To afford an idea of the operating times, the time duration from $t1$ to $t2$ (FIG. 3) is about 50 milliseconds. From the average torque signal on line 71 and the information stored in the computer, a level signal is provided on line 92 to regulate the torque during the shift period, in that it generally controls the slope of the "ramp" of the torque curve as represented by curve 35 in FIG. 3. The adaptive computer 93 also provides a gain-control signal on line 94, and a third output signal on line 95 which is coupled to a feed-forward circuit 96. This feed-forward circuit includes a first passive element 97, an active component 98 which receives not only the signal from component 97 but also an LC4 logic command signal, and an output active component 100 for providing an output signal from the feed-forward combination on line 101. A passive feedback component 102 is coupled around active stage 98, and a direct signal connection is provided from the input side of element 97 over conductor 103 to one input connection of stage 100. This feed-forward circuit is an anticipation circuit for providing a signal over line 101 which tends to compensate for the time delay required to fill the piston volume between times $t0$ and $t1$, before the static phase of the shift sequence begins.

The output signal from feed-forward stage 100 is passed over line 101 to another active element 104, which operates as a switch that is closed upon receipt of an LC4 logic command signal to provide an output signal over line 105 to the pulse width modulation circuit 52. PWM circuit 52 thus receives four input signals: the error signal over line 48 from the closed loop controller 47; the feed-forward compensating signal over line 105; and the logic command signals LC1 and LC2 from the logic control circuit 51. Because LC1 is only generated and supplied over cable 53 when a signal is produced by movement of the shift pattern lever, this signal need not be further described.

In closed loop controller 47, loop gain control circuit 106 receives both the gain-regulating signal over line 94 from the adaptive computer 93, and an output signal over line 107 from summation stage 87. The output signal from gain control circuit 106 is passed through another passive component 108 to a loop compensation circuit 110, which comprises an active stage including an integration circuit 111, a parallel-coupled passive element 112, another passive element 113 coupled between the output side of stage 111 and one input connection of the active stage 114, and a conductor 115 connected to pass a signal directly from component 108 to one input connection of stage 114. The output side of stage 114 is then the closed loop controller output signal, or the error signal, for application to the pulse width modulation circuit 52.

Control valve assembly 56 includes a spool 120. This valve was constructed as a two-stage control valve. However by providing a pulse width modulation (PWM) signal to energize winding 55 in the pilot portion of the valve, the valve position can be effectively regulated so that operation similar to that of a continuously variable valve is achieved. Thus as used herein the term "control valve" includes a conventional (albeit much more expensive) servo valve, as well as the economical two-position valve disclosed herein. The fluid at the supply pressure is provided as shown over a conduit 57, and passes to the right to the right end of spool 120. Some of the supply fluid is also directed to the left, and passes through first stage fixed orifice 121, the first stage variable orifice 123 is regulated by the PWM signal applied to winding 55. Hence the net flow at the left end of spool 120 is a function of both the fixed orifice 121 and the variable orifice 123. The other side of the variable orifice 123 is coupled through a channel 135 to the return pressure line 58. The control pressure is provided in line 124, and applied to the transmission for regulating the gear ratio change as described above.

The components of the transmission are also generally shown in FIG. 5, and are numbered in agreement with the general showing of a planetary gear set in FIGS. 1 and 2, except that the brake 25 in FIG. 2 is shown as a one-way clutch in FIG. 5. The particular transmission controlled by the present invention is not important. Any transmission can be used which provides input and output driving connections, and a gear change controlled by the pressure of the fluid in line 124.

Figure 6:
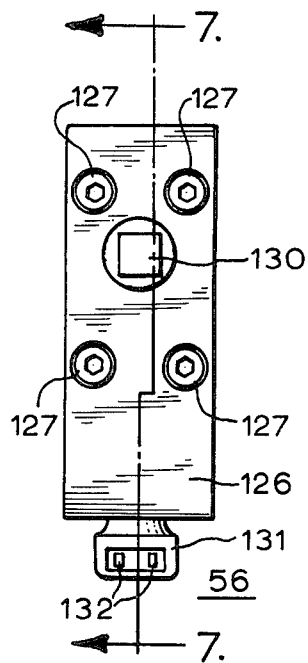
FIG. 6 is an end view and FIG. 7 is a sectional view, illustrating details of a control valve.
Figure 7:
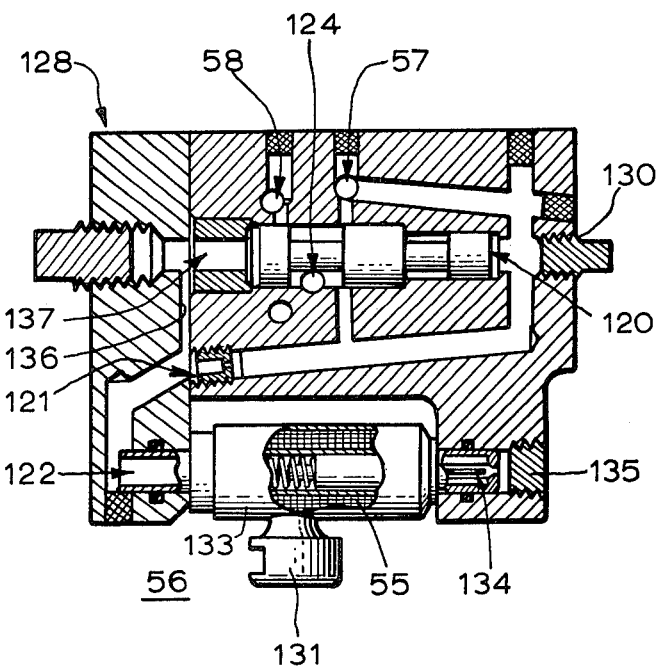

FIGS. 6 and 7 illustrate additional details of the two-position valve 56 used in the earlier control system. The end view of FIG. 6 shows the valve body 126 which is fastened with four screws 127 to the valve body cover 128 (FIG. 7). FIG. 6 also illustrates the stop 130 at the right end of spool 120, and a depending plug body 131 with a pair of electrical contacts 132 for receiving the conductors carrying the output signal from PWM circuit 52 for application to the solenoid winding 55 within the valve body.

FIG. 7 illustrates the solenoid body 133, with the winding 55 inside the solenoid body. The PWM signal applied to the solenoid winding determines the effective position of plunger 134 and thus regulates the effective opening of the variable orifice 123. The fluid under pressure is admitted through the channel 57, and flows to the right and then down, past the right end of spool 120, and then to the left and down to the first stage fixed orifice 121. After this orifice, the major portion of the fluid passes downwardly and to the right through inlet line 122, through the solenoid interior channel, and through variable orifice 123, determined by the average position of solenoid plunger 134. The fluid passing through the variable orifice is then returned through the discharge port 135, which is connected to the same pressure return line as the channel 58.

A portion of the fluid which passes through the first stage fixed orifice 121 also passes upwardly through channel 136 to valve stop 137, thus applying a reaction to the left side of spool 120. As this valve is illustrated at full scale, those skilled in the art will readily fabricate a suitable two-position valve or use a valve equivalent to the structure depicted in FIGS. 6 and 7. It is again emphasized that a servo valve, one which is adjustable to any point in a range of positions, can be provided in lieu of the illustrated valve arrangement. However the economic considerations of implementing the system in the automotive market militate against use of the more expensive servo valve.

Figure 8:
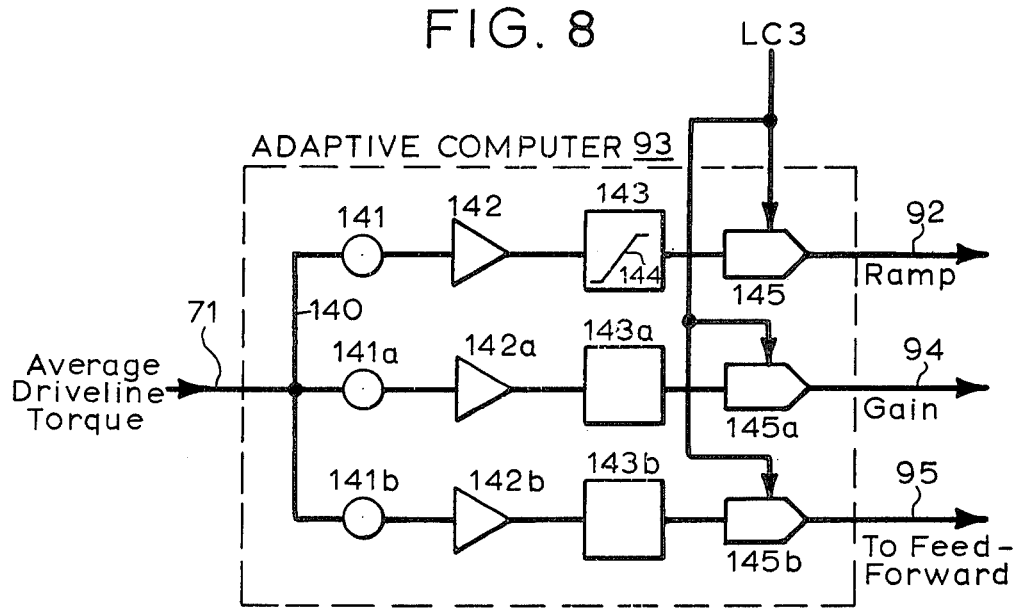
FIG. 8 is a block diagram of an adaptive computation circuit used in the earlier system.

FIG. 8 depicts in a simplified form the circuit arrangement of adaptive computer 93, which receives two input signals. The first, on line 71, is a function of the average driveline torque, and the second is a logic command signal LC3 which issues at the beginning of the static phase of the shift. For example, the torque signal on line 71 is applied over a common conductor 140 to a first passive component 41 for initially adjusting the gain of the received signal, which is then passed over a buffer amplifier 142 to the input side of a variable gain amplifier 143. The sloping gain characteristic 144 shown within this amplifier indicates that a preset gain can be provided by selection of the appropriate component to provide the degree of slope and thus the desired gain. The output of the adjustable gain stage 143 is applied to the input side of a memory stage 145. This memory stage continually receives the input signal from stage 143 and, when the logic command signal LC3 is received, the signal level then present is stored and continually presented on the output conductor 92 for regulating the ramp portion of the torque curve (FIG. 3). Similar components referenced with the letters "a" and "b" are provided to store and hold signals, on conductors 94 and 95, for application to gain control stage 106 and the feed-forward circuit 96 when the logic command signal LC3 is provided. Other suitable circuits can be utilized to implement the adaptive computation, with the only requirement being the individual modification of the input torque signal on line 71 in the different channels, and the storage of the resulting modified signals at time t1 when LC3 issues.

Figure 9:
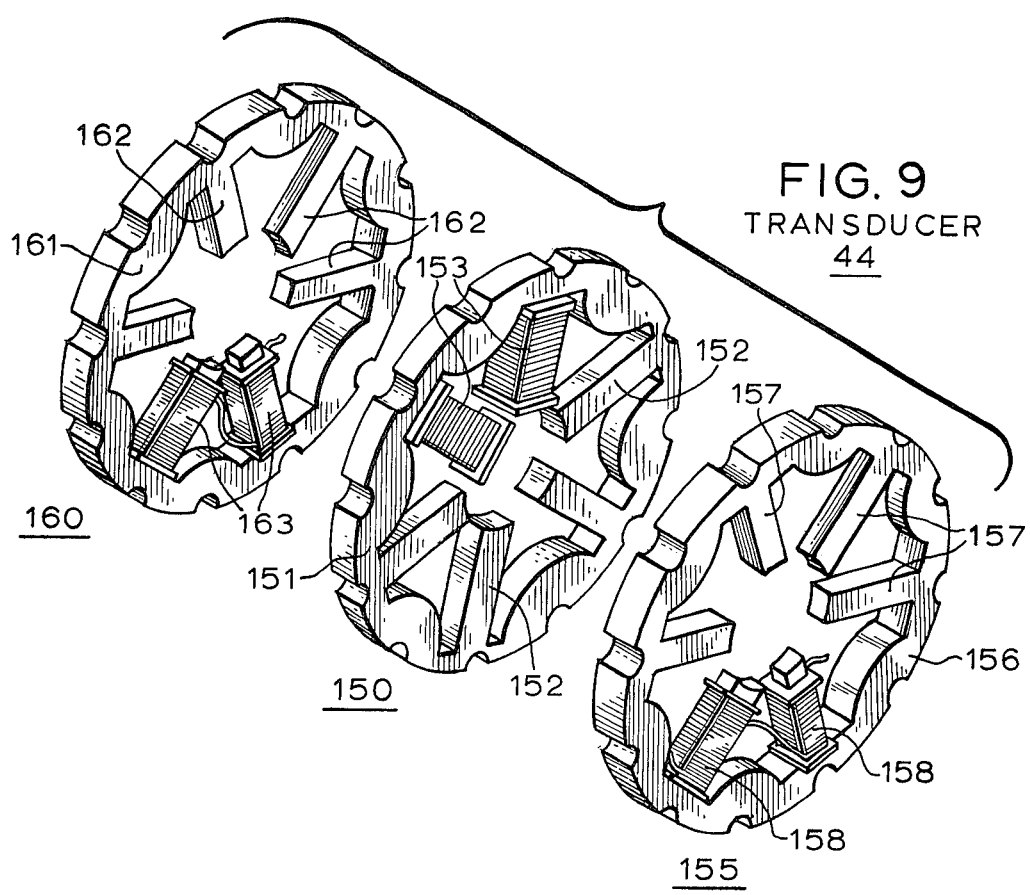
FIG. 9 is an exploded, perspective illustration.
Figure 10:
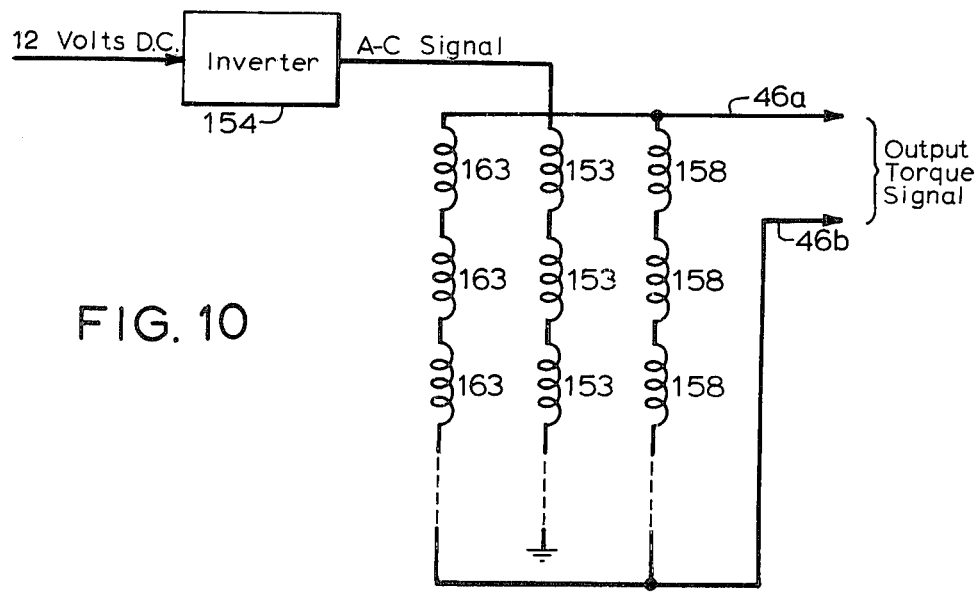
FIG. 10 is a simplified schematic diagram, depicting a transducer suitable for use with such system.

FIG. 9 is a simplified, exploded view of salient components of transducer 44. In this art it is now generally known that a magnetic field can be established (for example, by passing an a-c current through a coil) adjacent a permeable shaft, and some means for detecting the field or magnetic flux is then positioned near the energizing arrangement used to establish the initial magnetic field. As a permeable member such as output shaft 42 has a torque applied to it, it is subjected to compressive and tensile forces which change its permeability, and thus modify the flux pattern. Accordingly a central structure 150 can be provided with an outer circular magnetic circuit 151, simply provided by a plurality of magnetically conductive ring members or laminations. A plurality of pole pieces 152 are formed by extensions of the outer ring laminations, and individual windings 153 (only two windings are shown) are provided on each of the pole pieces. The windings 153 are connected in series as shown in FIG. 10, and energized from an inverter 154 which in turn is powered from the car's electrical system. The magnetic field thus established passes through that portion of shaft 42 (FIG. 4) which is centered between the pole pieces 152. A second magnetic structure 155 is also provided, with laminations 156 forming a magnetic circuit and another plurality of pole pieces 157 on which a like plurality of windings 158 are provided. These windings 158 are also connected in series and, through output conductors 46a, 46b provide an indication of the stress in the shaft 42 which can be utilized to provide the driveline torque signal. For this system, it has been found desirable to place another magnetic structure 160 around the shaft on the other side of the energizing structure 150, with a magnetic circuit 161, a plurality of pole pieces 162 and series-connected windings 163 on these poles, similar to the other arrangements. It has been found that, with only one magnetic pick-up structure (such as 155), a part of the signal induced in the windings 158, 163 varies as a function of the shaft speed, introducing an undesirable error into the torque output signal on conductors 46a, 46b. However the speed-dependent signal components in windings 158, 163 are virtually 180° out of phase with each other. Accordingly by connecting the two arrays of the series-coupled windings 158, 163 in parallel as shown, the speed-caused error component is virtually eliminated and the resultant torque-indicating signal provides a very good representation of the actual driveline torque. Sensor means, other than the illustrated transducer 44, can be used so long as a suitable output torque signal is provided as a function of the drive torque.

Figure 11:
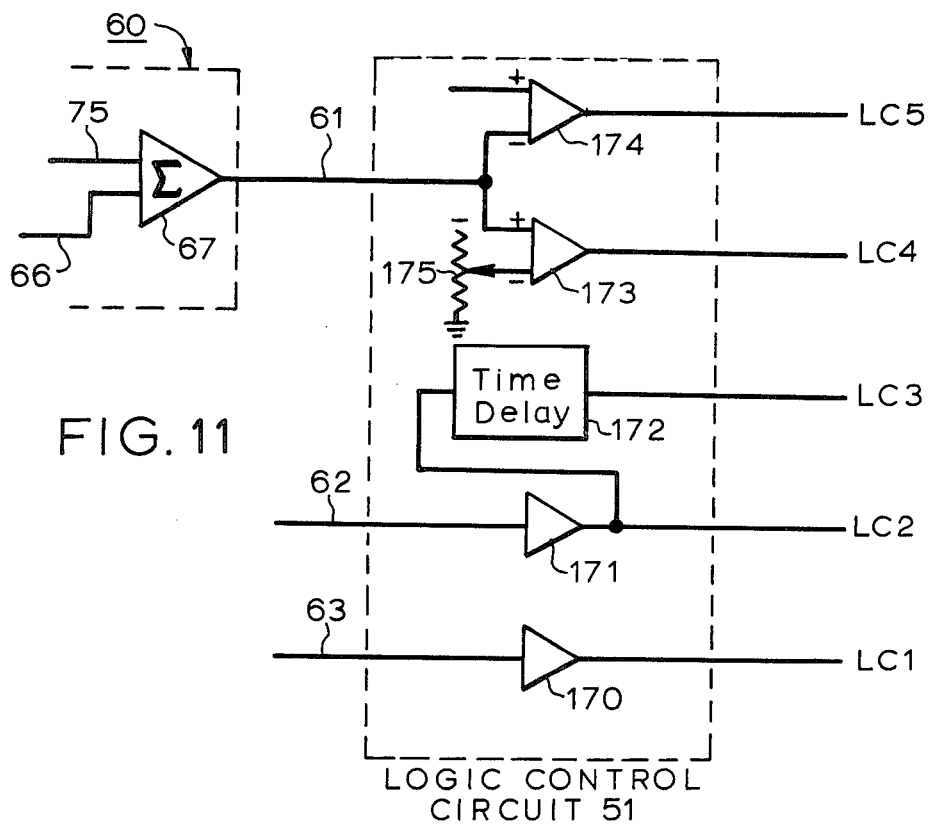
FIG. 11 is a block diagram setting out details of the logic control circuit of the earlier system.

FIG. 11 is a simplified diagram depicting components of logic control circuit 51. The shift pattern signal received on line 63 is used, after passing through buffer amplifier stage 170, to provide signal LC1 when a downshift is called for by the operating conditions. The shift point signal on line 62 passes through another buffer amplifier 171 to provide the LC2 signal at time t0 as shown in the idealized diagram of FIG. 3 and the actual graphical illustration of FIG. 13. The output signal from amplifier 171 (FIG. 11) is also passed through a fixed time delay stage 172 to develop the LC3 signal at a predetermined time t1, related to the piston fill volume as previously described.

The simulated reaction torque signal—that is, calculated by operating upon the actual torque signal—on line 61 is applied to one input of a first comparator 173 and also to one input of a second comparator 174. A potentiometer 175 provides a reference signal which is applied to the other input connection of comparator 173. This comparator stage 173 switches, or produces the output logic command signal LC4, at a percentage of the reaction torque value which is determined by setting of potentiometer 175. Comparator 174 provides the LC5 signal at the time when the reaction torque signal on line 61 has decreased to zero.

OPERATION OF THE EARLIER SYSTEM

Figure 12:
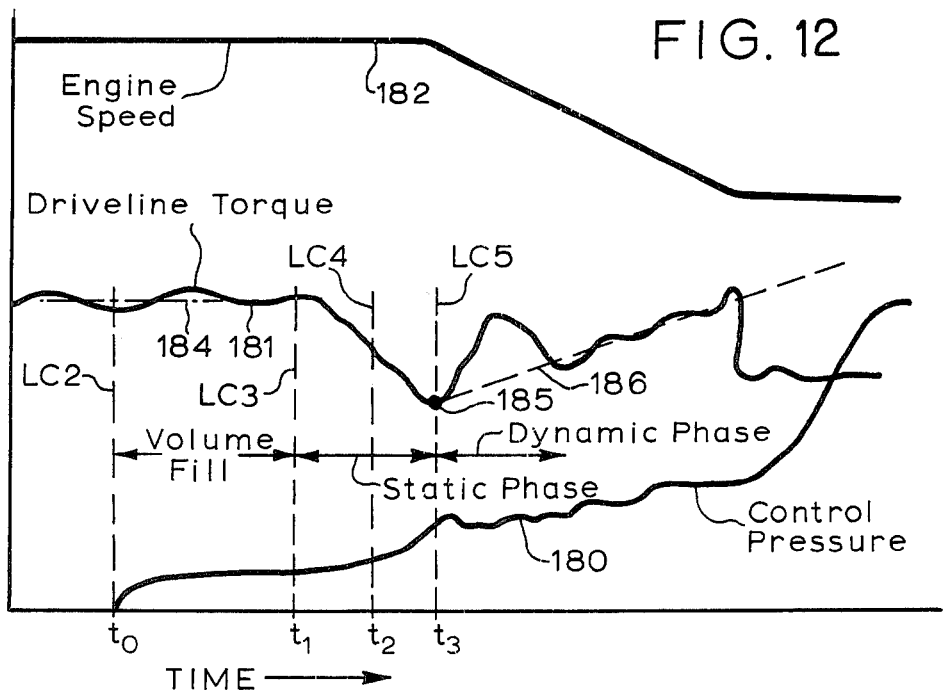
FIGS. 12 and 13 are graphical illustrations useful in understanding operation of the earlier system during upshift and downshift of the transmission.

A general perspective of the system operation considering the earlier application wherein a one-way clutch was employed in place of friction brake 25, can best be given in connection with FIG. 12, depicting actual values of the different parameters measured in an operating embodiment of that earlier system. As there shown curve 180 represents the control pressure from the valve 56 passed to the controlled on-coming friction element in the automatic transmission; curve 181 depicts the actual driveline torque as monitored by transducer 44; and curve 182 illustrates the engine speed variation during the shift sequence.

At the outset the "shift" command is received from shift point computer 77 over conductor 62 and is applied to the logic control circuit. As evident from the description in connection with FIG. 11, this provides the LC2 logic command signal at time t0, which is applied to PWM circuit 52 and thus immediately begins to modify the position of the spool 120 in valve 56 to commence filling the piston volume. Simultaneously the LC2 signal is applied to the summation stage 65 in reaction torque computer 60, so that stage 65 goes operational and begins to integrate the level of the driveline signal. As shown in FIG. 12, the actual torque signal 181 varies above and below an average level 184 at this time. Hence an average signal is being developed and, over line 71, is also being supplied to the input circuit of adaptive computer 93. Subsequently, after a time duration determined by the time delay circuit 172, logic command LC3 is issued at time t1 as shown in FIG. 12, and applied to memory stage 72 in reaction torque computer 60. Thus the value then present at the input of memory 72, connoting the averaged driveline torque signal, is stored and, after division by gear ratio R, is continuously presented at one input connection 75 of summation stage 67. At the same time the instantaneous driveline torque value is continually supplied over line 66 to the other input connection of summation stage 67. The output signal from stage 67 is the difference between the two input signals, and it is this signal on line 61 which simulates the reaction torque signal.

When the reaction torque value on line 61 differs by a certain percentage from a preset torque value—established by the setting of potentiometer 175—the logic command LC4 is provided by comparator stage 173. If a one-way clutch is not used, this signal LC4 is used to release the band or disc element of brake 25 that retains ring gear 24, and in the present system the command LC4 is used to supply the feed-forward signal from circuit 96 to the PWM circuit 52, to compensate the control valve 56. The LC4 signal is applied to the integrating stage 98 in the feed-forward circuit, so that this stage becomes operational and supplies an initial signal value to one of the inputs of comparator 100. The other input to comparator 100 is the instantaneous signal from adaptive computer 93 which is passed over conductor 103. At time t2 signal LC4 also closes switch 104 and thus applies the output from the feed-forward circuit to the pulse width modulation circuit. This occurs approximately mid-way through the static phase of the upshift cycle.

When the instantaneous value of the reaction torque signal on the output conductor 61 goes to zero, comparator 174 is switched and produces LC5 as its output signal. This signal effectively "closes the loop" of the complete control system. That is, memory stage 85 receives an LC5 command and thus stores the value of the torque signal then present on conductor 84; this torque signal is thereafter presented as the output signal on line 88 to summation stage 87, in effect determining the level of the point referenced 185 of the driveline torque. At the same time the LC5 signal causes summation stage 91 to go operational, providing a continuing ramp signal on conductor 90 which determines the slope identified by the broken line 186 of the average torque change desired during the dynamic phase of the upshift. The signals from the adaptive computer were all provided at time t1 when the static phase of the shift was initiated, establishing the reference levels for subsequent operation of the stages 85, 91 at time t3. At this time the driveline torque was also locked in, over line 86 to the summation stage 87, as an electrical input command to the closed loop circuit. The torque will then change over the average ramp value 186 as shown in FIG. 12 which is determined by the ramp provided from stage 91 until completion of the upshift. The loop stability is governed by gain control stage 106 operating at a specific gain value as determined by the adaptive computer.

Figure 13:
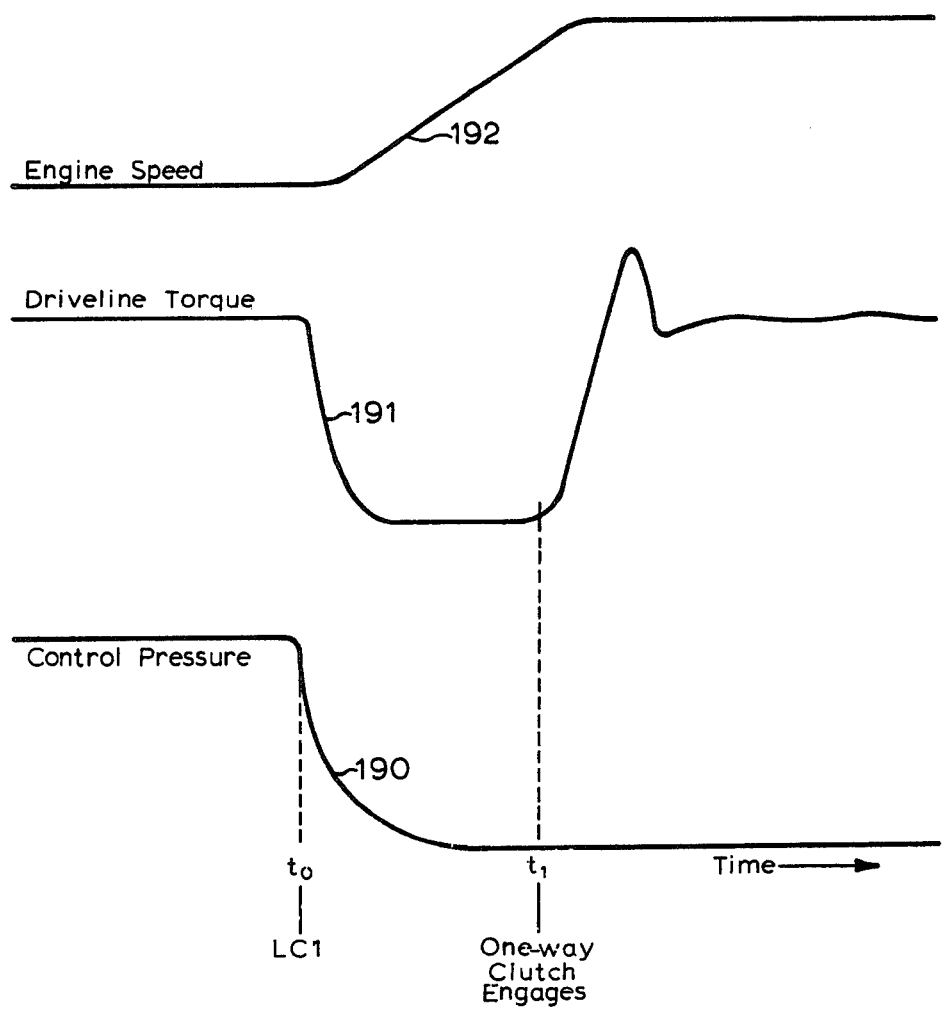

FIG. 13 depicts the variations of engine speed, driveline torque, and control pressure when a downshift is indicated for the earlier system in which a one-way clutch was used in place of the controlled brake 25. This operation is initiated by a signal developed in the logic control circuit 51, to issue the LC1 command signal at this time. Immediately the control pressure begins to drop as indicated by the curve 190, the driveline torque also begins to drop rapidy as depicted by the curve 191, and the engine speed gradually increases as shown by curve 192. The output torque bottoms out and, at time t1, the one-way clutch engages; the torque then rapidly begins to increase towards its previous value. After some overshoot, the output torque again stabilizes, as does the engine speed. Thus with a one-way clutch, the downshift is simple and straight forward.

GENERAL DESCRIPTION OF THIS INVENTION

The system of the earlier application described in connection with FIGS. 3–13 explains system operation when a one-way clutch effects automatic release of the off-going component. At the outset, it is important to emphasize that most automatic transmissions employ not only a one-way clutch but also a friction clutch (or brake) to regulate release of that off-going element. The friction clutch is effectively connected "in parallel" with the one-way clutch to regulate the gear ratio change under certain operating conditions. In analyzing the earlier system, it was determined that if the friction clutch or brake in parallel with the one-way clutch could be controlled very precisely, then the one-way clutch could be removed to realize a substantial economy.

The one-way clutch has been employed because it enhances the shift quality. That is, it cannot "make a mistake", and must release at precisely the correct moment in the shift sequence. However, under certain conditions, such as coasting downhill, the wheels may be attempting to drive the engine, passing torque backward through the transmission to the input shaft. Under these conditions the one-way clutch does not lock and, to avoid free-wheeling, there must be a controllable friction element which can be engaged to provide the necessary reaction. Accordingly, since the transmission must have the friction brake element for certain conditions, it would be very desirable to provide such precise control of that element that the one-way clutch is not required.

To achieve such precise regulation of the off-going element, it is necessary to determine the torque level required on the off-going element to accelerate the engine speed, at a predetermined rate, from its given value just prior to this shift to a higher speed, determined by the gear ratio. If this engine acceleration torque level can be accurately determined, then the shift can be controlled. Assuming the engine acceleration torque value is less than $To$, the calculated value can be subtracted from the initial output torque $To$ (provided by transducer 46) to define the proper shift level torque $Ts$.

Those skilled in the art will understand that the relationship between the shift torque level $Ts$ and the initial torque output level $To$, just prior to the shift, is related to the other engine parameters including the gear ratios, engine inertia and $\Delta t$ by the following equation:

$$Ts = \frac{To - R_1{}^2 Ie(Ro - 1)\omega o\ [R_1{}^2 Ie(Ro - 1)]/\Delta t}{\Delta t} \quad (1)$$

In this expression $R_1$ represents the gear ratio presently established by the transmission, and $Ro$ represents the ratio into which the transmission will be shifted. Ie represents the engine inertia, and $\omega o$ indicates the initial vehicle speed, or the product of engine speed times the gear ratio. The time required for the shift to be accomplished is designated $\Delta t$. It is thus apparent that the gear ratios and the engine inertia can be considered a constant K, and equation (1) can be rewritten thus:

$$Ts = To - K(\omega o/\Delta t) \tag{2}$$

Thus it is evident that the expression $\omega o/\Delta t$ represents the predetermined rate at which the engine speed must be accelerated as described above. A primary object of this invention is thus the real time calculation of this predetermined rate after the shift is initiated to effect the desired shift control in a very accurate manner.

Those skilled in the art will recognize the difficulty of activating the on-coming friction member at exactly the correct time, making the appropriate allowance for the time required to both fill the chamber of the actuator which controls the on-coming member and take up the operating clearances. Thus this is another important object of the present invention. These main objects can be achieved and the equation above satisfied if the engine acceleration torque can be calculated, by calculating the torque required to accelerate the engine from its initial speed to the new speed. If this engine acceleration torque can be calculated, and the initial torque $To$ can be measured in a known manner, then the torque $Ts$ (or shift torque) can be determined by subtracting the engine acceleration torque from the initial torque. However, some accommodation must be made if the calculated engine acceleration torque is greater than the initial torque level $To$, and the system of this invention accommodates this case as will be explained below.

DETAILED DESCRIPTION OF THIS INVENTION

The present invention uses certain components of the system described and claimed in the above-identified earlier application. However, particularly in accordance with this invention, a friction brake 25 (FIG. 2) is provided which is selectively controllable, and there is no one-way clutch in parallel with the friction brake 25. To control the system of this invention, FIG. 14 indicates an additional control valve 256 is provided and regulated by an added pulse width modulation circuit 252. The system of this invention is so precise in operation and exact in timing that the use of the additional one-way clutch is not required, achieving a considerable cost reduction.

Figure 14:
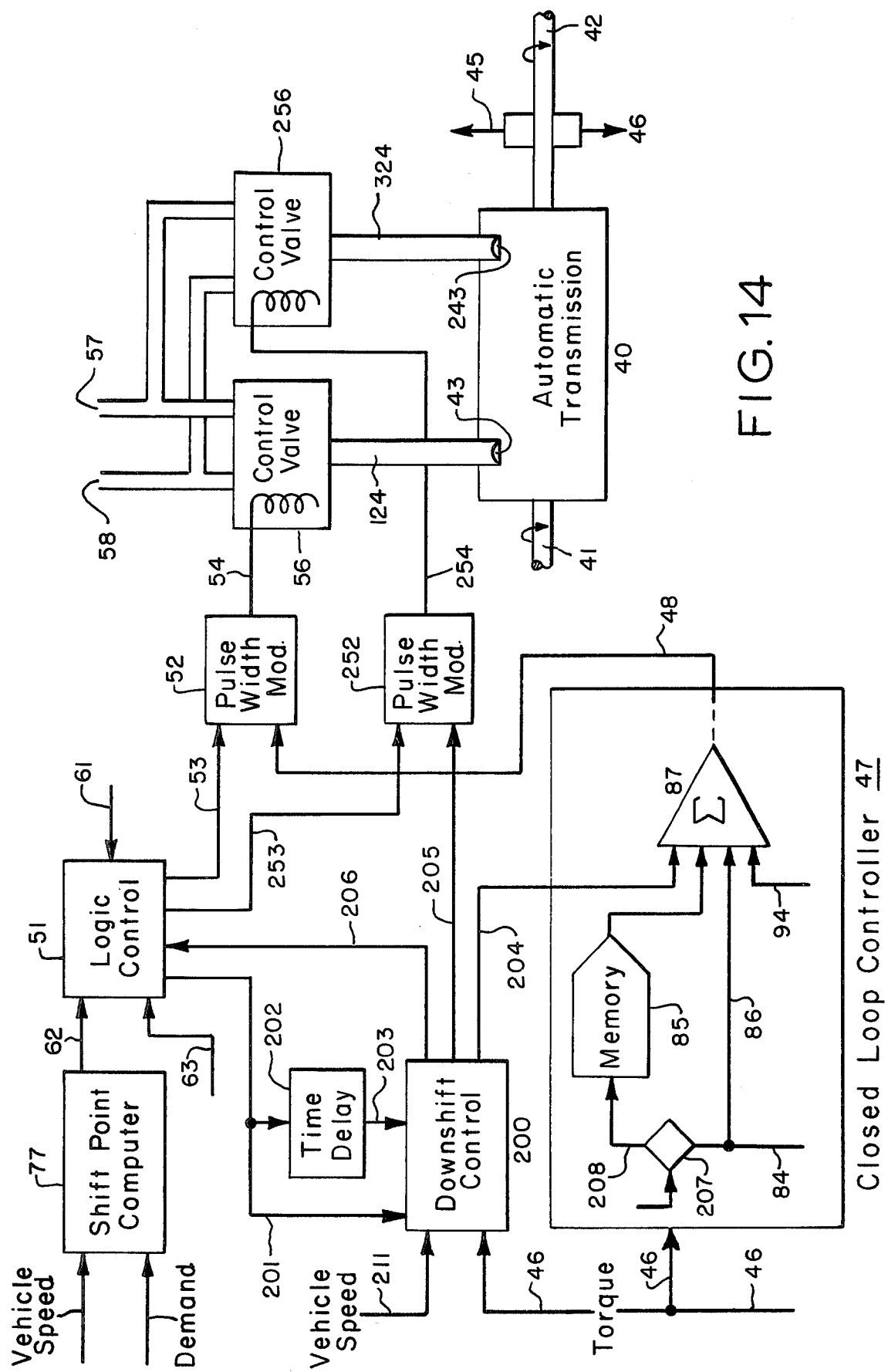
FIG. 14 is a block diagram showing the components of this invention in conjunction with the earlier system illustrated in FIG. 4.

The upshift provided with the system of FIG. 14 is simple and direct. The provision of signals LC1 and LC2 to pass over line 53 and regulate pulse width modulation circuit 52 in the upshift has been described in the earlier application. It was also noted that the brake would be released (if one were used in lieu of the described one-way clutch) at the time of the LC4 logic signal. Accordingly to provide the upshift this LC4 logic control signal is passed over line 253 to the second pulse width modulation circuit 252 to effect the operation of the second control valve 256 in the proper time sequence to regulate the upshift.

The downshift is a more complex control operation, because the engine acceleration torque must be computed to determine the torque shift level $Ts$. This requires the addition of a downshift control circuit 200 as shown in FIG. 14, and the modification of summation stage 87 in the closed loop controller 47 to receive a signal from the downshift control circuit 200. Shift point computer 77 shown in the upper left corner of FIG. 14 provides the downshift signal to logic control circuit 51 in response to a vehicle speed signal and a demand signal, such as represented by the throttle position. These signals are the conventional ones normally applied to a shift point computer in a vehicle.

Logic control circuit 51 provides a shift-initiate signal LC1$d$ over line 201 to the downshift control circuit when the shift point computer indicates, by a signal on line 62, that a downshift should be undertaken. The downshift-initiate signal LC1$d$ is delayed in time-delay circuit 202 to develop a second logic control signal LC2$d$, which is then passed over line 203 to the downshift control circuit. The downshift control circuit 200 generates the appropriate logic signals for application over line 204 to summation stage 87 in the closed loop controller 47, so that after processing therein, the signal on line 48 will be used to de-energize the clutch by regulating pulse width modulation circuit 52. Another signal is provided on line 205 to regulate pulse width modulation circuit 252, to bring on the brake pressure at the appropriate time in the downshift sequence. A reset signal is provided on line 206 to the logic control circuit 51 at the termination of the downshift operation.

The closed loop controller 47 receives the signal from downshift control circuit 200 over line 204 as shown. In addition there is a switch 207 provided between the line 84 and line 208, so that closure of switch 207 regulates application of the filtered torque signal on line 84 to the memory stage 85. With this general perspective of the addition of the downshift control arrangement 200, together with the addition of second pulse width modulation circuit 252 and the second control valve 256, a more detailed description of the downshift control circuit 200 and the calculation of the shift torque level Ts will now be provided in connection with FIG. 15.

As there shown the torque signal To on line 46 is applied to the input side of memory stage 212 and also, over line 213, to the input side of a filter 214. The output side of filter 214 passes a filtered torque signal over line 215 to one input of a comparator circuit 216, and, over line 217, to one input connection of memory stage 218. The input vehicle speed signal present on line 211 appears at the input side of memory stage 220. Thus the torque and the vehicle speed signals are already present on conductors 46 and 211, when the logic control circuit 51 (FIG. 14) provides a signal LC1$d$ on line 201 to initiate the downshift. This occurs near the beginning of the several curves depicted in FIG. 16. As there shown, the uppermost curve 221 represents engine speed, the second curve 222 depicts the variations in the output torque over the downshift interval, curve 223 connotes changes in the off-going clutch pressure as the first valve 56 is regulated, and the last curve 224 portrays changes in the on-coming brake pressure as the second control valve 256 is regulated. Initiation of the downshift by the signal LC1$d$ on line 201 is represented on the time base of FIG. 16. This signal is applied to memory stages 212 and 220 at this time, causing these stages to go operational and store the values of the respective torque and speed signals present at their inputs when the downshift is initiated.

Figure 15:
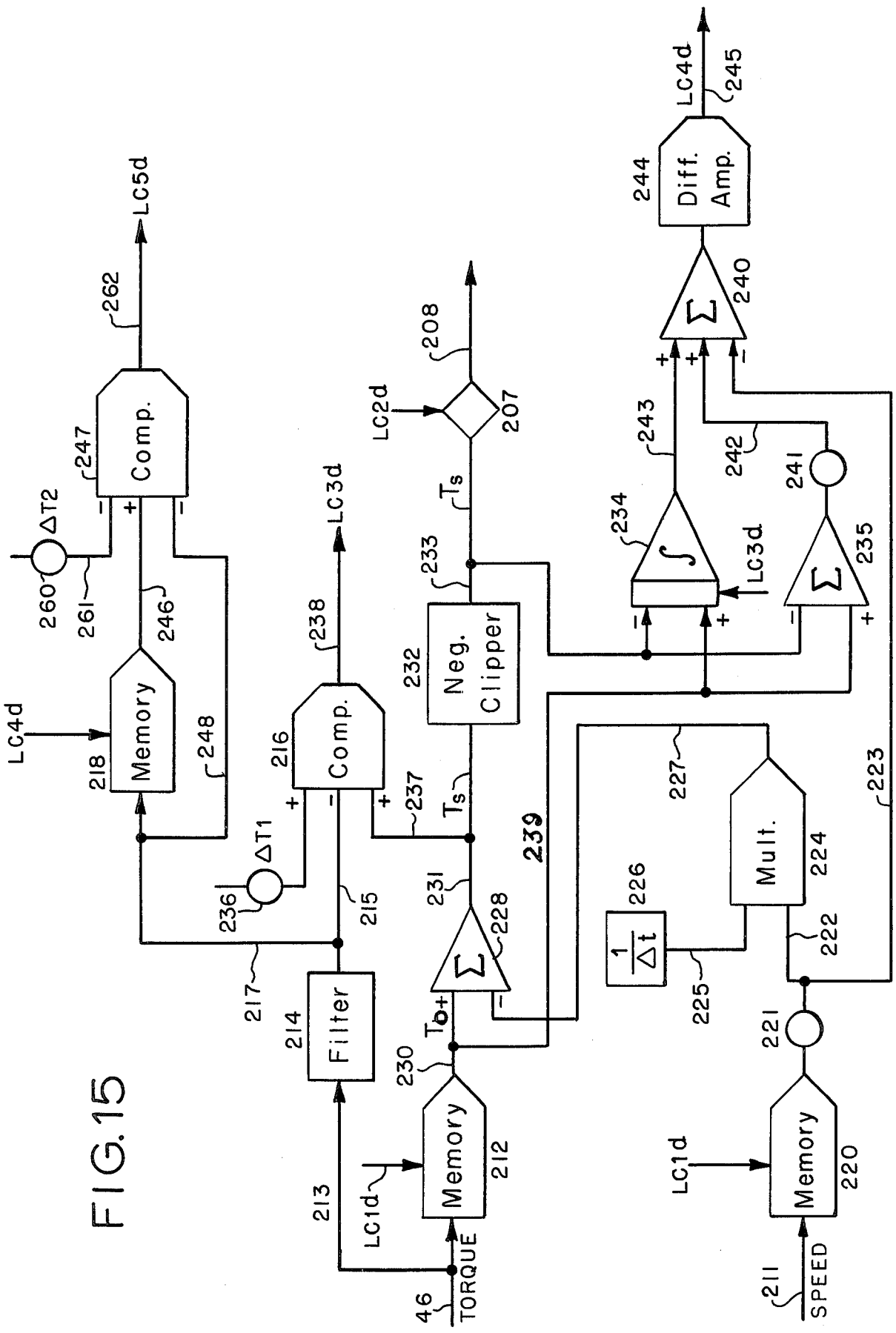
FIG. 15 is a block diagram of the downshift control circuit shown in FIG. 14.

The stored vehicle speed signal $\omega o$ in memory stage 220 is passed through a passive component 221. The symbols in FIG. 15 are generally similar to those used in FIG. 5, and thus it is apparent that element 221 represents a variable resistor or some other element which can be adjusted to operate on the signal received from memory stage 220 in a predetermined manner. In accordance with the present invention, this element is adjusted to represent the expression K used in equation (2) of the downshift analysis set out above. Thus the output signal on both lines 222 and 223 represents the initial vehicle speed $\omega o$ at the beginning of the shift, which is a function of the engine speed and gear ratio, multiplied by K. This represents the calculation of the numerator of the fraction which is the last term in equation (2).

Multiplier stage 224 also receives another signal, $1/\Delta t$, on line 225 from a storage element 226. The value stored in stage 226 is represented as the inverse of time $\Delta t$, where this $\Delta t$ represents the denominator of the fractional term in equation (2), and is also the time interval over which the engine speed changes, represented by the ramp portion of curve 221 in FIG. 16. Thus the output signal of multiplier stage 224 on line 227 is a product of the two input signals, and this resultant signal represents the calculated engine acceleration torque, or the fractional expression in both equations (1) and (2). As noted above, the requisite torque shift level Ts (see curve 222, FIG. 16) can be determined by subtracting the engine acceleration torque from the initial output torque To. Accordingly the calculated engine acceleration torque signal is passed over line 227 to one input connection of a summation stage 228. This summation stage 228 also receives the initial torque signal To over line 230 from memory stage 212. Accordingly the summation stage 228 subtracts the calculated engine acceleration torque value on line 227 from the initial torque level signal To on line 230, providing on line 231 a signal which represents the shift torque level Ts shown on curve 222 of FIG. 16.

As noted above, the calculated engine acceleration torque may exceed the initial torque level To. As evident from equation (2), this would lead to a negative value for the shift level torque Ts. Under such conditions, the system uses the maximum torque available to accelerate the engine—the maximum available torque is To, the initial torque level. This can be done by setting Ts in equation (2) equal to zero, and using To as the engine acceleration torque. This in fact is what the circuit of FIG. 15 accomplishes.

The negative clipping stage 232 insures that the Ts signal present on output line 233 cannot go negative, notwithstanding the value of the calculated engine acceleration torque signal on line 227. This has the effect of setting Ts equal to zero when the calculated engine acceleration torque exceeds the initial torque value To. Thus the shift torque signal Ts on line 233, related to the torque shift level signal Ts in FIG. 16, is passed to one side of switch 207, to one input connection of integrator-timer stage 234, and to the upper intput connection of summation stage 235.

Figure 16:
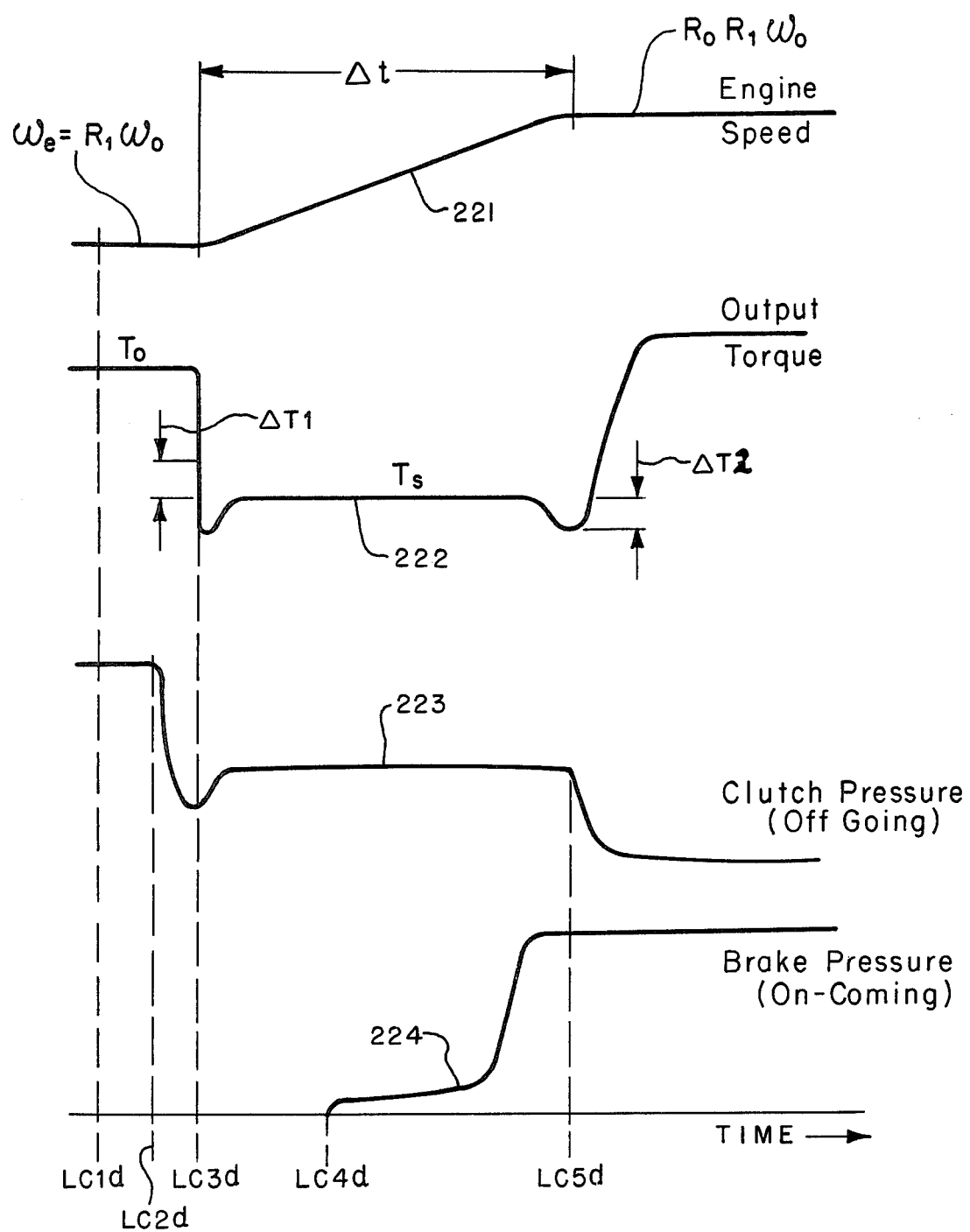
FIG. 16 is a graphical illustration which, taken with FIGS. 14 and 15, is useful in understanding the present invention.

Referring to FIG. 16, after LC1d has been provided over line 201 to store the initial values in memory stages 212 and 220 as described, at a time thereafter fixed by delay stage 202, LC2d is issued to begin the release of pressure in the off-going clutch element 26. This causes the pressure, represented by curve 223 in FIG. 16, to begin to decrease very rapidly. The signal LC2d is applied to the switch 207 (FIG. 15) to close this switch and pass the torque-shift level signal Ts over line 208 to the memory stage 85 (FIG. 14). The pressure represented by curve 223 in FIG. 16 continues to decrease, and at a later time the output torque represented by curve 222 also begins the decrease very rapidly. A predetermined change in this torque level, denoted $\Delta T1$ in FIG. 16, is represented by the passive element 236 coupled to the upper input terminal of comparator stage 216. On line 215 this stage is receiving the filtered output torque signal To, and on line 237 is receiving the output signal from summation stage 228, representing the torque shift level Ts. Hence the comparator stage 216 is "looking for Ts", and provides an output signal LC3d on line 238 when the filtered torque signal on line 215 reaches the magnitude of the bias and Ts signals on the other two input connections. When this occurs the logic control signal LC3d on line 238 is issued.

The logic control signal LC3d is applied as shown to the timer-integrator stage 234, causing this stage to go operational. It is noted that the initial torque signal To is passed from memory stage 212, over lines 230 and 239 to the positive input terminal of stage 234. Thus if the calculated engine acceleration torque exceeds initial torque To, Ts is (in effect) made equal to zero by clipper stage 232, and To is used (over line 239) as the engine accelerating torque signal. If the signal Ts is greater than zero, it is applied to the negative input terminal of stage 234, reducing the value of the input signal integrated by this stage when the LC3d signal is received. The resultant integrated signal is passed over line 243 to the upper positive input terminal of summation stage 240. This same summation stage receives another signal over line 223 at its negative input terminal; this is similar to a "calculated $\Delta t$" signal. The third input signal to stage 240 is received over line 242 from summation stage 235 and passive gain-control element 241. The circuit including stage 235 and element 241 compensates for the fill time of brake member 25. When the signal from stage 234 on its output line 243 overcomes the signal on line 233, the output signal from stage 240 switches and causes differential amplifier 244 to provide the logic control signal LC4d on its output line 245. This signal is used to initiate fluid input into the brake actuator, as represented by curve 224 in FIG. 16. Summation stage 240 can also be considered the point at which equation (2) is "solved", or at which the terms of this equation are brought together. Considering the inputs at stage 234, these inputs provide the term To-Ts. After timer stage 234 goes operational, when LC3d is received, the time $\Delta t$ is factored in, providing (To-Ts) $\Delta t$. The signal on line 223 represents $K\omega o$; hence the output of stage 240 is a function of all the terms in equation (2). As noted above, the signal on line 242 is a refinement, to compensate for actuator fill time, and is not basic to the shift control as a function of To, Ts, and the engine acceleration torque.

The LC4d signal also causes memory stage 218 to go operational and pass the stored torque signal To over line 246 to one input connection of the comparator stage 247. This stage also receives the filtered torque signal directly over line 248, and a bias signal as set by component 260 is received over line 261. This bias signal is designated $\Delta T2$ in FIG. 16. These three input signals are continually presented to the input side of comparator stage 247. When the output torque dips, as shown by $\Delta T2$ on curve 222, this provides a signal that causes the output of comparator 247 to change and provide the LC5d control signal on its output line 262. Curve 223 shows that some finite pressure was being maintained in the clutch, to hold the shift torque value Ts in the system. When comparator stage 245 switches, the signal LC5d is used to completely release the pressure of the off-going clutch 26, and to reset the system logic for the next downshift sequence.

In the appended claims the term "connected" means a d-c connection between two components with virtually zero d-c resistance between those components. The term "coupled" indicates there is a functional relationship between two components, with the possible interposition of other elements between the two components described as "coupled" or "intercoupled".

While only a particular embodiment of the invention has been described and claimed herein, it is apparent that various modifications and alterations of the invention may be made. It is therefore the intention in the appended claims to cover all such modifications and alterations as may fall within the true spirit and scope of the invention.

What is claimed is:

1. An electronic control system for regulating change of gear ratio in a vehicle having an engine and an automatic transmission with input and output mechanical driving connections, which transmission also has first and second controllable friction elements, one of which elements is released and the other of which is engaged during a gear ratio change, which system comprises:

a transducer, positioned to sense the output torque $T_o$ at the transmission output driving connections and to provide a first electrical signal which varies as a function of the output torque;

means for providing a vehicle speed signal, and for operating on the vehicle speed signal to produce a second electrical signal which is also a function of the transmission gear ratios and the engine inertia;

additional means connected to modify the second electrical signal in accordance with a predetermined time $\Delta t$ over which the engine speed is to be changed from a first value to a second value, thus providing a calculated engine acceleration torque signal; and means, including an output summation stage, connected to receive a third signal which is the integrated difference between the initial torque signal $T_o$ and the calculated engine acceleration torque signal, and also to receive the second signal, to provide an output signal at the appropriate time to control the on-coming one of the controllable elements in the transmission.

2. An electronic control system as claimed in claim 1, and further comprising an input summation stage, connected to receive both the first electrical signal representing output torque $T_o$ and the calculated engine acceleration torque signal, and to provide an algebraic sum of these two signals to provide a shift torque level signal $T_s$.

3. An electronic control system as claimed in claim 2, and further comprising a negative clipper stage connected to receive the shift torque level signal $T_s$ produced by the input summation stage, operative to insure the shift torque level signal cannot have a negative value notwithstanding the magnitude of the calculated engine acceleration torque signal.

4. An electronic control system as claimed in claim 3, and further comprising a timer-integrator stage, having a positive input terminal connected to receive the output torque signal $T_o$ and a negative input terminal connected to the output side of the negative clipper stage, which timerintegrator stage operates to provide a signal connoting the term $(T_o - T_s)\Delta t$.

5. An electronic control system as claimed in claim 4, and further comprising a comparator stage, having a first input of one polarity connected to receive a signal denoting the instantaneous level of the torque at the transmission output driving connection, a second input connection of the opposite polarity connected to receive the desired shift torque level signal $T_s$, and a third input connection of the same polarity as the second input connection connected to receive a bias level signal, such that said comparator switches to provide an output signal for rendering the integrator-timer stage operational at the proper time as the output torque level from the transmission reaches the desired shift level $T_s$.

6. An electronic control system as claimed in claim 5, and further comprising an additional summation stage, having a pair of input terminals connected in parallel with the inputs of the integrator-timer stage, and a passive element coupled between the output side of the additional summation stage and an input connection of the output summation stage, to compensate the system for the time required to fill the piston of the actuator for the oncoming one of the controllable elements.

7. An electronic control system for regulating change of gear ratio in an automatic transmission which has input and output mechanical driving connections, a first controllable component connected for actuation by a change in fluid pressure received through a first fluid inlet, and a second controllable component connected for actuation by a change in fluid pressure received through a second fluid inlet comprising:

a transducer, positioned to sense the torque at the transmission output driving connection and to provide an electrical signal which varies as a function of the output torque;

a first control valve, coupled between a supply fluid line and the transmission first fluid inlet, for regulating the fluid pressure at the first fluid inlet of the transmission;

a second control valve, coupled between the fluid supply line and the transmission second fluid inlet, for regulating the fluid pressure at the second fluid inlet of the transmission;

first and second pulse width modulation circuits, respectively coupled to the first and second control valves, for providing control signals to regulate operation of the valves;

a closed loop controller, coupled between the transducer and the first pulse width modulation circuit, to receive the output torque signal as a feedback signal and provide an error signal for regulating operation of the first pulse width modulation circuit as a function of the error signal, which controller includes a summation stage;

a downshift control circuit, coupled between the transducer and the second pulse width modulation circuit, to receive the output torque signal as a feedback signal, and also connected to receive a vehicle speed signal, connected to provide an error signal to the second pulse width modulation circuit and to provide a shift-level torque signal to the summation stage in the closed loop controller;

a reaction torque computation circuit, connected to receive the output torque signal from the transducer and to produce a reaction torque output signal; and a logic control circuit, coupled to the reaction torque computation circuit and operative to provide a plurality of logic command signals for application to the closed loop controller and to the downshift control circuit upon receipt of the reaction torque signal to regulate the gear ratio change.

8. An electronic control system as claimed in claim 7 and in which
each of said control valves is a two-position valve with a solenoid positioned to regulate the fluid pressure as a function of a received electrical control signal.

9. An electronic control system as claimed in claim 7, in which
said reaction torque computation circuit includes means for producing an average torque signal at a connection point, and in which said control system further includes
an adaptive computation circuit, having an input circuit coupled to said connection point of the reaction torque computation circuit, operative to provide a plurality of output signals to modify operation of the closed loop controller as a function of the average torque signal received from the reaction torque computation circuit.

10. An electronic control system as claimed in claim 9, and in which
said closed loop controller comprises a summation stage connected to receive said feedback signal, a ramp control stage, connected to receive one of the output signals from the adaptive computation circuit and to form a ramp-controlling output signal which is applied to an input connection of said summation stage, such that the ramp-forming signal is a function of the average torque signal supplied to the adaptive computation circuit, and means for passing a signal from the downshift control circuit to the summation stage, to modify operation of the first pulse width modulation circuit during a downshift.

11. An electronic control system for regulating downshift in a vehicle having an engine and an automatic transmission with input and output mechanical driving connections, which transmission also has first and second controllable friction elements, connected to regulate the downshift as a function of received output torque and vehicle speed signals, which control circuit comprises:
a first memory stage for storing the value of the output torque signal when activated, and the memory stage for storing the value of the vehicle speed signal when activated, and means for activating both the first and second memory stages when a downshift-initiate signal is provided;
a passive component coupled to the second memory circuit, for operating upon the stored vehicle speed signal to produce a resultant signal also related to the transmission gear ratios and the engine inertia;
a storage stage for storing a signal related to the inverse of the time period $\Delta t$ over which the engine speed is to be accelerated during the downshift;
a multiplier stage, connected to receive both the resultant signal from the passive element and the inverse of the time period signal from the storage stage, operative of produce an output signal which is the calculated engine acceleration torque;
an input summation stage, having a positive polarity input connection coupled to the first memory stage for receiving the stored initial torque signal $To$, and a negative polarity input connection connected to receive the calculated engine acceleration torque signal, thus producing an output desired shift torque level signal $Ts$, representing the desired level of output torque during the shift time $\Delta t$;
a timer-integrator stage, having a positive polarity input connection coupled to the output side of the first memory stage to receive the initial output torque signal $To$, and the negative polarity input connection connected to receive the desired torque shift signal $Ts$;
an output summation stage, having a positive polarity input connection connected to receive the output signal from the timer-integrator stage, and a negative polarity input connection coupled to the passive component to receive the resultant signal representing the initial vehicle speed, the gear ratios, and the engine inertia; and
means for utilizing the output signal from the output summation stage to regulate the timing of the oncoming control component, in a manner to accommodate the fill time of the actuator and to take up the operating clearances of the system components.

12. An electronic control system as claimed in claim 11, and further comprising a negative clipper stage, coupled between the input summation stage and the negative input terminal of the timer-integrator circuit, thus insuring that the desired torque level $Ts$ is in effect set to zero whenever the magnitude of the calculated engine acceleration torque signal exceeds the level of the stored initial output torque signal $To$.

13. An electronic control system as claimed in claim 12, and further comprising a comparator circuit, connected to receive the desired torque level signal $Ts$, a second signal representing the instantaneous value of the output torque, and a third signal representing a bias level, which comparator is operative to switch and energize the timer-integrator circuit as the system output torque approaches the desired torque shift level $Ts$.

14. The method of controlling the downshift in an automatic transmission having first and second controllable friction elements, comprising the steps of;
storing the values of the transmission output torque of the vehicle speed when the shift is initiated;
utilizing the values of the transmission gear ratios, the engine inertia, and the time period over which the downshift should be accomplished, together with the stored vehicle speed signal, to calculate the desired engine acceleration torque;
subtracting the calculated engine acceleration torque value from the stored output torque value to obtain a desired shift torque level value; and
utilizing the desired shift torque level value to control the transmission during the time duration of the downshift.

15. The method of controlling the downshift in an automatic transmission as described in claim 14, and further comprising the step of setting the desired shift torque level signal equal to zero whatever the calculated engine acceleration torque exceeds the level of the stored initial torque value, and using the value of the stored initial torque value as the actual engine acceleration torque value to regulate the downshift.

* * * * *

UNITED STATES PATENT OFFICE
CERTIFICATE OF CORRECTION

PATENT NO. : 4,102,222
DATED : July 25, 1978
INVENTOR(S) : Alan Leonard Miller and Werner Paul Petzold It is certified that error appears in the above-identified patent and that said Letters Patent are hereby corrected as shown below:

Claim 1, column 17, line 27, cancel "connections" and insert -- connection --.

Claim 4, column 17, line 67, cancel "timerintegrator" and insert -- timer-integrator --.

Claim 11, column 19, line 48, before "memory" insert -- second --.

Claim 11, column 19, line 63, cancel "of" and insert -- to --.

Signed and Sealed this

Twentieth Day of February 1979

[SEAL]

Attest:

RUTH C. MASON
Attesting Officer

DONALD W. BANNER
Commissioner of Patents and Trademarks